United States Patent [19]

Kaitani et al.

[11] Patent Number: 5,329,088
[45] Date of Patent: Jul. 12, 1994

[54] ELECTRICAL DISCHARGE POWER SUPPLY CIRCUIT

[75] Inventors: Toshiyuki Kaitani; Toshiharu Adachi, both of Aichi, Japan

[73] Assignee: Mitsubishi Denki Kabushiki Kaisha, Tokyo, Japan

[21] Appl. No.: 909,981

[22] Filed: Jul. 7, 1992

[30] Foreign Application Priority Data

Mar. 6, 1992 [JP] Japan .................. 4-049621

[51] Int. Cl.$^5$ .............................. B23H 1/02
[52] U.S. Cl. .................................. 219/69.18
[58] Field of Search ............ 219/69.13, 69.18, 69.19

[56] References Cited

U.S. PATENT DOCUMENTS

| 3,087,044 | 4/1963 | Inoue | 219/69.18 |
| 3,257,583 | 6/1966 | Pfau | 219/69.18 |
| 3,777,108 | 12/1973 | Maillet | 219/69.18 |
| 4,967,054 | 10/1990 | Obara et al. | 219/69.13 |
| 5,083,001 | 1/1992 | Kinbara et al. | 219/69.18 |

FOREIGN PATENT DOCUMENTS

| 16-18638 | 10/1941 | Japan . | |
| 50-29449 | 3/1975 | Japan . | |
| 60-123218 | 7/1985 | Japan . | |
| 60-155321 | 8/1985 | Japan . | |
| 60-180721 | 9/1985 | Japan | 219/69.13 |
| 62-88512 | 4/1987 | Japan | 219/69.18 |
| 2-71920 | 3/1990 | Japan | 219/69.13 |

Primary Examiner—Geoffrey S. Evans
Attorney, Agent, or Firm—Sughrue, Mion, Zinn, Macpeak & Seas

[57] ABSTRACT

An electrical discharge machining power supply circuit for machining a workpiece, including: a power supply circuit; a first circuit including a first switching device and a first rectifying device; a second circuit including a second switching device and a second rectifying device; an electrical discharge machining electrode for providing an electrical discharge to the workpiece; and a first circuit device for preventing an excessive current generated by wiring inductance in the circuit from damaging at least the first switching device.

19 Claims, 11 Drawing Sheets

FIG. 1

Fig. 2(a) REPEATED PULSE FOR MOSFET 6,7

Fig. 2(b) MOSFET 6,7 CURRENT IDS

Fig. 2(c) CURRENT IAK IN DEVICES 8,9

Fig. 2(d) CURRENT IG BETWEEN X-Y

Fig. 2(e) VOLTAGE VXY BETWEEN X-Y

Fig. 2(f) VOLTAGE VG (GAP VOLTAGE)

Fig. 2(g) VOLTAGE ACROSS DEVICE 12

Fig.10(a) GATE PULSE JOR MOSFET 6,7

Fig.10(b) MOSFET 6,7 CURRENT IDS

Fig.10(c) CURRENT IAK DEVICES 8,9

Fig.10(d) CURRENT BETWEEN X-Y

Fig.10(e) VOLTAGE VXY BETWEEN X-Y

Fig.10(f) GAP VOLTAGE VG

Fig.10(g) VOLTAGE DEVICE 12

Fig.10(h) CURRENT DEVICE 17

ELECTRICAL DISCHARGE POWER SUPPLY CIRCUIT

FIELD OF THE INVENTION

The present invention relates to a power supply circuit for an electrical discharge machine and, more particularly, to an electrical discharge machining power supply circuit which prevents switching devices in the circuit from being damaged.

BACKGROUND OF THE INVENTION

Figure 15:
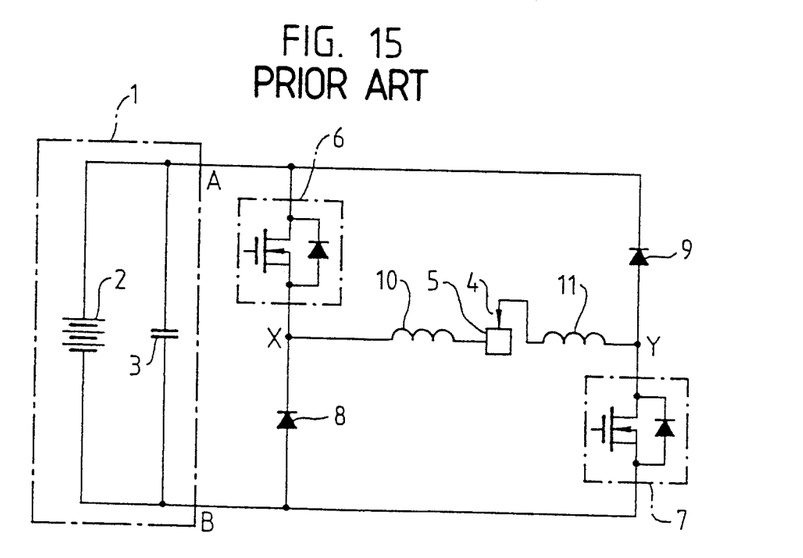
FIG. 15 is a circuit diagram illustrating an electrical discharge machining power supply known in the art.

FIG. 15 is a circuit diagram illustrating an electrical discharge machining power supply which is representative of the power supply circuit disclosed in Japanese Patent Publication No. 60-123218. As shown in FIG. 15, the circuit includes a direct-current power supply circuit 1 including a direct-current power supply 2 and a capacitor 3. It is desirable for the capacitor 3 to be a rapid-response capacitor and for the direct-current power supply circuit 1 to be a circuit having a small inductance. The circuit of FIG. 15 further includes an electrical discharge machining electrode 4, a workpiece 5, rectifying devices 8, 9 (e.g., diodes) and MOSFETs 6 and 7 serving as switching devices and including parasitic diodes, respectively. The MOSFET 6 and the rectifying device 8 are connected in series with the direct-current power supply circuit 1 to form a first series circuit, and the MOSFET 7 and the rectifying device 9 (which are opposite in connection sequence to the first series circuit), are also connected in series with the direct-current power supply circuit 1 to form a second series circuit. The electrical discharge machining electrode 4 and the workpiece 5 are in series with each other between connection points X and Y. Connection point X is a connection point between the MOSFET 6 and the rectifying device 8 in the first series circuit, and connection point Y is a connection point between the MOSFET 7 and the rectifying device 9 in the second series circuit. A closed loop including the direct-current power supply 2, the MOSFET 6, the workpiece 5, the electrical discharge machining electrode 4 and the MOSFET 7 constitutes a discharge circuit, and a closed loop including the capacitor 3, the rectifying device 8, the workpiece 5, the electrical discharge machining electrode 4 and the rectifying device 9 constitutes a feedback circuit. The reference numerals 10 and 11 represent wiring inductances in the circuit.

Figure 16A:
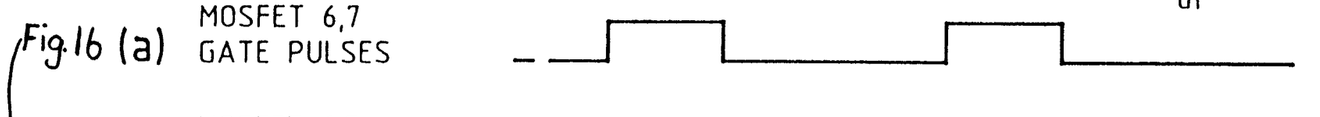
FIGS. 16(a)-16(f) are timing charts illustrating the operation of the electrical discharge machining power supply shown in FIG. 15.
Figure 16B:
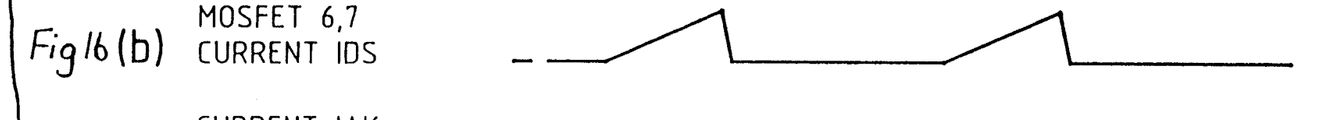
Figure 16C:
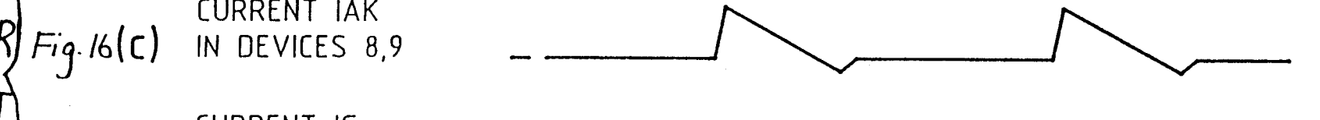
Figure 16D:
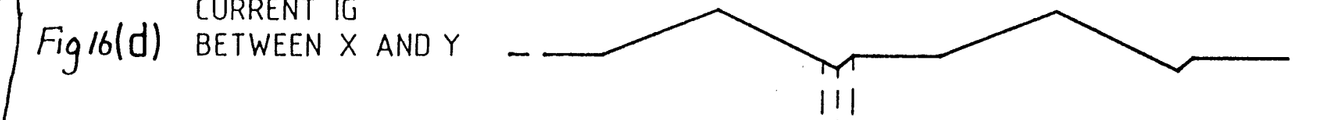
Figures 16E, 16F:
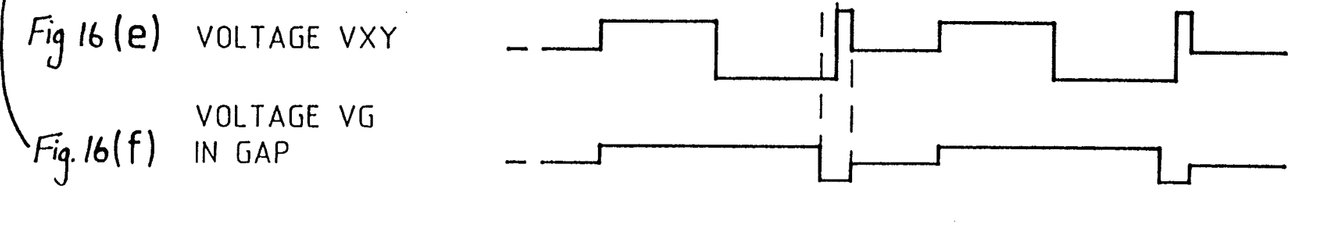

The operation of the circuit shown in FIG. 15 will now be described with reference to the timing chart shown in FIG. 16. FIG. 16(a) shows a repeated pulse applied to the gates of the MOSFETs 6, 7, the application of which causes the MOSFETs 6, 7 to alternately turn on and off in synchronization with each other. FIG. 16(b) shows a current Ids flowing in the MOSFETs 6, 7. FIG. 16(c) shows a current Iak flowing in the rectifying devices 8, 9. FIG. 16(d) shows a current IG flowing from point X to Y in FIG. 15, i.e. the current IG flowing in the wiring inductances 10, 11 and in a gap between the electrical discharge machining electrode 4 and the workpiece 5. FIG. 16(e) shows a voltage Vxy across the connection points X and Y in FIG. 15, and FIG. 16(f) shows a voltage VG imposed across the gap.

When the pulse shown in FIG. 16(a) is input to the gates of the MOSFETs 6, 7, and the MOSFETs 6, 7 are switched on simultaneously, the voltage VG is applied to the gap between the electrical discharge machining electrode 4 and the workpiece 5 to start a discharge, and the gap current IG flows in the gap. Specifically, the current flows from a power supply terminal A to a power terminal B via the MOSFET 6, the workpiece 5, the electrical discharge machining electrode 4 and the MOSFET 7 (which constitute the discharge circuit). If Vo is the terminal-to-terminal voltage of the direct-current power supply circuit 1, and L1 and L2 are the inductances of the wiring inductances 10, 11, respectively, then the following relationship exists for the gap circuit Ig:

$$dIg/dt = (Vo - Vg)/(L1 + L2)$$

Hence, the current increases linearly as shown in FIGS. 16(b) and (d). When the MOSFETs 6, 7 are switched off, however, the current accumulated in the wiring inductances 10, 11 flows through the feedback circuit. That is, the current flows from the power supply terminal B to the capacitor 3 of the direct-current power supply circuit 1 via the rectifying device 8, the workpiece 5, the electrical discharge machining electrode 4, the rectifying device 9 and the power supply terminal A. Since the direction of the current flow and the direct-current power supply circuit 1 are opposite in polarity, the current reduces linearly according to the following relationship:

$$dIg/dt = (-Vo - Vg)/(L1 + L2)$$

(See FIGS. 16(c) and (d)).

This reduction in the current continues for a certain amount of time, and the current may drop below zero amperes due to the reverse recovery characteristics of the rectifying devices 8, 9. The current then returns to zero at a large slope determined by the rectifying devices 8, 9, and the rectifying devices 8, 9 are switched off. At this time, as shown in FIG. 16(e), the voltage Vxy across the connection points X and Y in FIG. 15 becomes an excessive voltage which is determined by the following relationship:

$$Vxy = [(L1 + L2)] \, diD/dt + Vg$$

The excessive voltage is due to the large slope diD/dt which is determined by the rectifying devices 8, 9.

If, for example, the output voltage Vo of the direct-current power supply circuit 1 is 220V, the gap voltage Vg is 20V, the wiring inductance is 3μH, and the ON time of MOSFETs 6, 7 is 1.5μs, then the current becomes:

$$[(220V - 20V)/3\mu H] \, 1.5\mu s = 100A$$

Accordingly, it is possible to cause a large peak current of 100A, with a current pulse width at this of approximately 3μs (see FIG. 16(d)). However, if it is assumed that the reverse recovery time of the rectifying devices 8, 9 is 90ns, and that the current keeps decreasing for the first 60ns according to a slope determined by the wiring inductances 10, 11 and returns to zero amperes in the remaining 30ns, a reverse recovery current Irp (the maximum instantaneous value of the reverse current) is:

$$Irp = [(220V - 20V)/3\mu H] \, 60ns = 4A;$$

and a voltage Vlp developed in the wiring inductances 10, 11 at a time when the reverse recovery current Irp returns to zero amperes in the remaining 30 ns is:

$$Vlp = 3\mu H \times 4A / 30ns = 400V.$$

In the electrical discharge machining power supply circuit shown in FIG. 15, an excessive voltage generated in the wiring inductances 10, 11 may cause the MOSFETs 6, 7 to be damaged when the MOSFETs 6, 7 are switched off and the current accumulated in the wiring inductances 10, 11 decreases. This is because the rectifying devices, even if of an identical type, may vary in reverse recovery time. For example, if at the instant that the rectifying device 8 turns off the rectifying device 9 still remains in a reverse recovery state, then the potential at the connection point Y in FIG. 15 will almost be equal to that of the terminal A because the rectifying device 9 is on, and the potential at the connection point X in FIG. 15 will be the sum of the potential at the point Y and the excessive voltage because the rectifying device 8 is off. At this time, a current flows through the parasitic diode of the MOSFET 6. Specifically, the current circulates from the rectifying device 9 to the parasitic diode of the MOSFET 6 via the electrical discharge machining electrode 4 and the workpiece 5. Since the parasitic diode of the MOSFET 6 has a relatively small current capacity, it is likely that the MOSFET 6 will be damaged if this circulation occurs one or more times.

SUMMARY OF THE INVENTION

Accordingly, it is an object of the present invention to overcome the disadvantages attendant to the prior art apparatus.

It is another object of the invention to provide an electrical discharge machining power supply circuit which prevents switching devices in the circuit from being damaged due to an excessive current generated in the wiring inductances of the circuit during the switching operation of the switching devices.

It is another object of the present invention to provide an electrical discharge machining power supply circuit that prevents a circuit element provided to prevent the switching devices from being damaged by the excessive current, from itself being damaged by the excessive current.

It is another object of the invention to provide an electrical discharge machining power supply circuit that does not require a surge absorber circuit for the switching and rectifying devices of the circuit, thereby simplifying the circuit arrangement.

These and other objects are achieved by the present invention which provides, according to one embodiment, an electrical discharge machining power supply circuit comprising:

a power supply circuit;

a first circuit, connected in parallel with said power supply circuit, and comprising a first switching device and a first rectifying device connected in series with said first switching device, said first circuit having a first connection point between said first switching device and said first switching device;

a second circuit, connected in parallel with said first circuit, and comprising a second switching device and a second rectifying device connected in series with said second switching device, said second circuit having a second connection point between said second switching device and said second switching device;

an electrode connected between the workpiece and said second connection point, said first and second switching devices being controlled such that an electrical discharge is generated between said electrode and the workpiece; and a first circuit device, connected between said workpiece and said first connection point, for preventing an excessive current, generated by wiring inductance between said first and second connection points during switching of said first and second switching devices, from damaging at least said first switching device.

In another embodiment of the invention, a second circuit device is provided to prevent the first circuit device from being damaged by the excessive current.

DETAILED DESCRIPTION OF THE PREFERRED EMBODIMENTS

Figure 1:
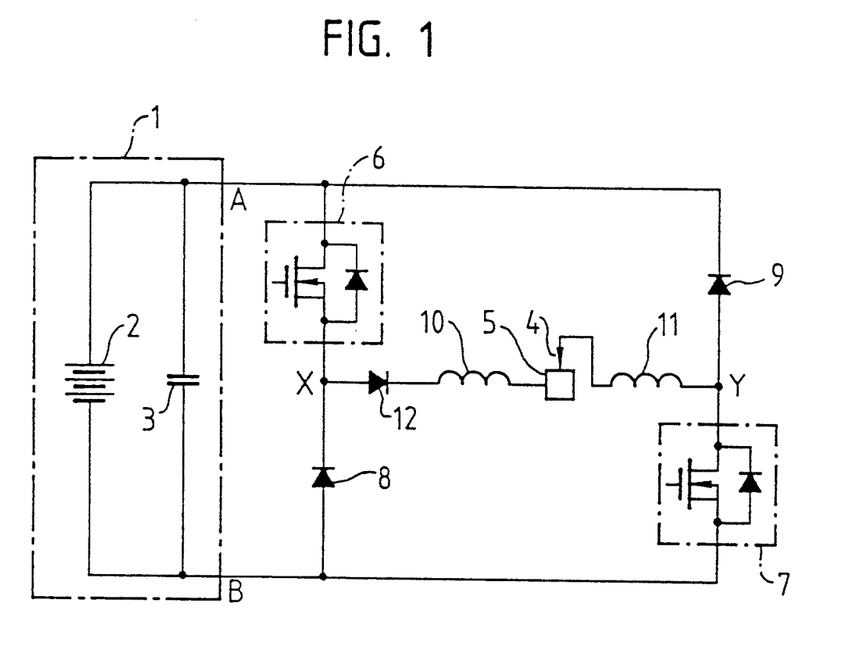
FIG. 1 is a circuit diagram illustrating a first preferred embodiment of the present invention.

FIG. 1 is a circuit diagram illustrating a first embodiment of the present invention, wherein elements identical to those in the prior art apparatus of FIG. 15 are identified by identical reference numerals. Further, like elements among the several embodiments are identified by like reference numerals.

As shown in FIG. 1, the apparatus includes a rectifying device 12 (e.g., a diode) disposed in series with the workpiece 5 and the electrical discharge machining electrode 4. The rectifying device 12 is designed to have a shorter reverse recovery time than does the rectifying device 8.

Figure 2A:
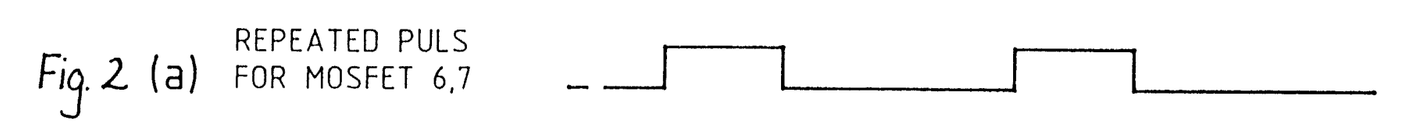
FIGS. 2(a)-2(g) are timing charts for illustrating the operation of the first preferred embodiment of the invention.
Figure 2B:
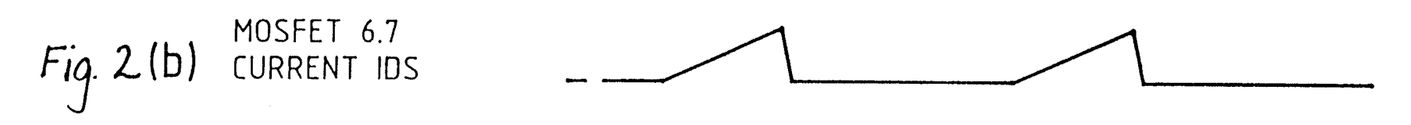
Figure 2C:
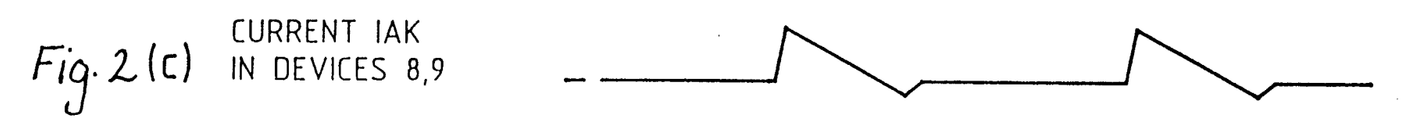
Figure 2D:
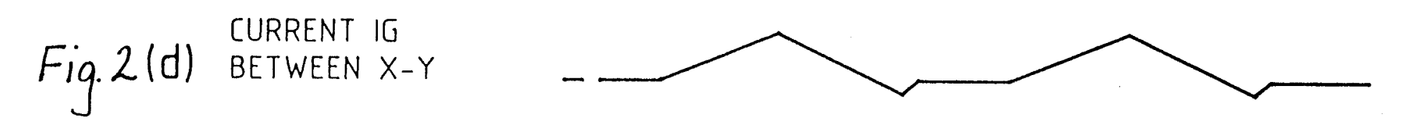
Figure 2E:
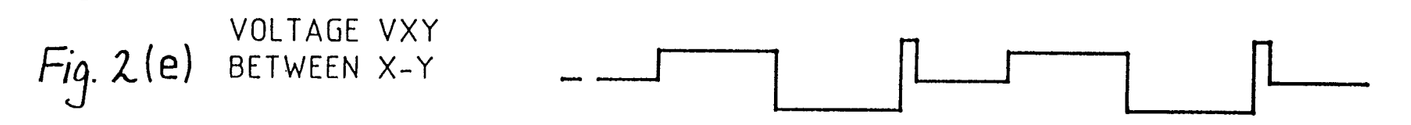
Figure 2F:
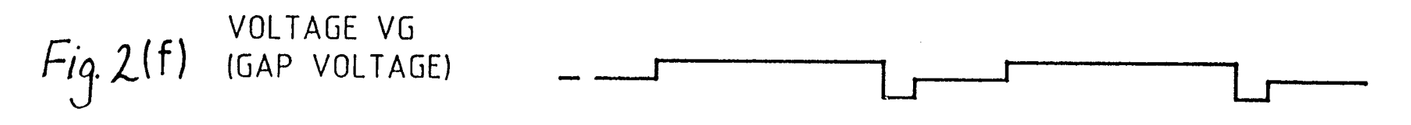
Figure 2G:
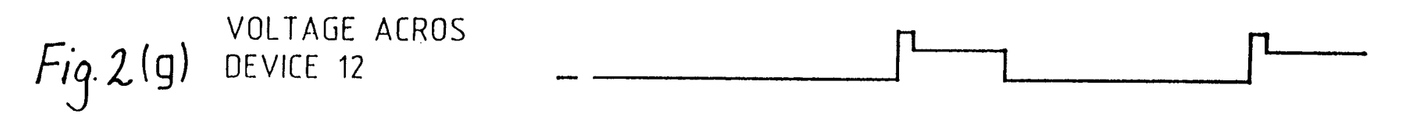

The operation of the electrical discharge machining power supply shown in FIG. 1 will now be described with reference to the timing chart shown in FIG. 2. FIG. 2(a) shows a repeated pulse applied to the gates of the MOSFETs 6, 7 to cause the MOSFETs 6, 7 to alternately turn on and off in synchronization with each other. FIG. 2(b) shows a current Ids flowing in the MOSFETs 6, 7. FIG. 2(c) shows a current Iak flowing in the rectifying devices 8, 9. FIG. 2(d) shows a current flowing from connection point X to connection point Y in FIG. 1, i.e., a current IG flowing in the wiring inductances 10, 11 and in the gap between the electrical discharge machining electrode 4 and the workpiece 5. FIG. 2(e) shows a voltage Vxy across the connection points X and Y in FIG. 1. FIG. 2(f) shows a voltage VG across the gap, and FIG. 2(g) shows a voltage applied across the rectifying device 12.

As shown in the timing chart of FIG. 2, the apparatus according to the present embodiment operates in an identical manner to the prior art apparatus of FIG. 15 before the rectifying devices enter a reverse recovery state. However, being shorter in reverse recovery time than the rectifying device 8, the rectifying device 12 is first switched off (i.e., before rectifying device 8) when the MOSFETs 6, 7 are turned off and the current accumulated in the wiring inductances 10, 11 is fed back. At this point, i.e., when the rectifying devices 8, 9 are still on and the rectifying device 12 is off, the potential at the connection point X in FIG. 1 is equal to that at the power supply terminal B, and the potential at the point Y is equal to that at the power supply terminal A. Assuming that Vo is a voltage between the terminals A and B of the direct-current power supply circuit 1, the voltage Vxy between the connection points X and Y in FIG. 1 is equal to Vo. At this point, an excessive current produced in the wiring inductances 10, 11 is imposed across the rectifying device 12, and not the MOSFETs 6, 7.

Therefore, assuming that, for example, the output voltage Vo of the direct-current power supply circuit 1 is 220V, the gap voltage VG is 20V, the wiring inductance is 3μH, each of the MOSFETs 6, 7 ON time is 1.5μs, the reverse recovery time of the rectifying device 12 is 45ns, and that the current continues to be reduced for the first 30ns according to a slope determined by the wiring inductances and returns to zero amperes in the remaining 15ns, then a reverse recovery current Irp (the maximum instantaneous value of the reverse current) is:

$$Irp = [(220V - 20V)/3\mu H]\ 30ns = 2A;$$

and a voltage Vlp generated in the wiring inductances 10, 11 at a time when the reverse recovery current Irp returns to zero amperes in the remaining 15ns is:

$$Vlp = 3\mu H \times 2A/15ns = 400V.$$

Since the rectifying devices 8, 9 are still on, the potential at the connection point X in FIG. 1 is zero volts, and the potential at the connection point Y is 220 volts. That is, a difference of 380 volts (i.e., the voltage difference between the voltage Vlp produced in the wiring inductances 10, 11 and the gap voltage VG) is applied to the rectifying device 12. Hence, by providing rectifying device 12 with a shorter reverse recovery time than the rectifying device 8, the application of an excessive reverse voltage to the MOSFETs 6, 7 can be prevented, and therefore the MOSFETs 6, 7 will not be damaged by the excessive voltage.

Figure 3:
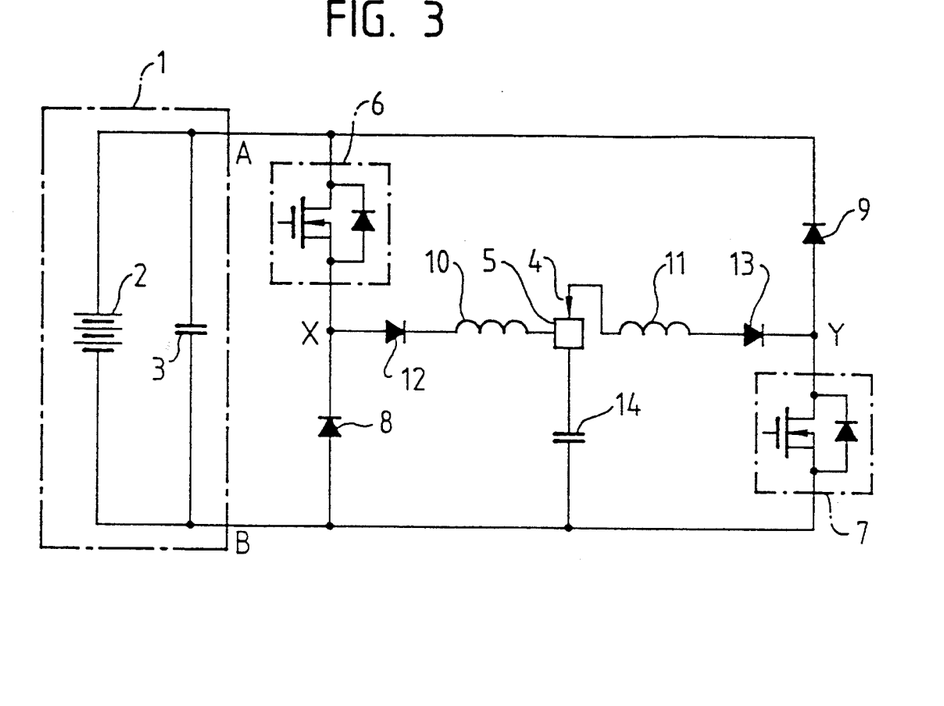
FIG. 3 is a circuit diagram illustrating a second preferred embodiment of the invention.

FIG. 3 is a circuit diagram illustrating a second embodiment of the invention. The embodiment of FIG. 3 is a modification of the first embodiment of FIG. 1. Specifically, whereas one rectifying device 12 is provided in series with the workpiece 5 and the electrical discharge machining electrode 4 in the first embodiment of FIG. 1, two rectifying devices 12, 13 shorter in reverse recovery time than the rectifying devices 8, 9, respectively, are disposed in the embodiment shown in FIG. 3. This arrangement prevents an excessive reverse voltage from being applied to the MOSFETs 6, 7 and therefore prevents the MOSFETs 6, 7 from being damaged if there is a stray capacitance 14 between the workpiece 5 and the terminal B of the direct-current power supply circuit 1.

For example, if the rectifying device 12 is first placed into the reverse recovery state and turned off when the MOSFETs 6, 7 are switched off, the excessive voltage generated by the wiring inductance 10 is applied across the rectifying device 12. However, the current accumulated in the wiring inductance 11 flows from the power supply terminal A to the power supply terminal B via the rectifying device 9, the electrical discharge machining electrode 4, the workpiece 5 and the stray capacitance 14. If at this time the rectifying device 13 is not provided, then the reverse recovery characteristic of the rectifying device 9 causes the potential at the connection point Y in FIG. 3 to be negative because of the excessive voltage produced by the wiring inductance 11 when the reverse recovery current, or the maximum instantaneous value of the reverse current, returns to zero amperes, thereby damaging the MOSFET 7. However, if the rectifying device 13 is provided as shown in FIG. 3, then the excessive voltage generated by the wiring inductance 11 is applied across the rectifying device 13, and the excessive reverse voltage is not applied to the MOSFET 7. Accordingly, MOSFET 7 is not damaged.

Figure 4:
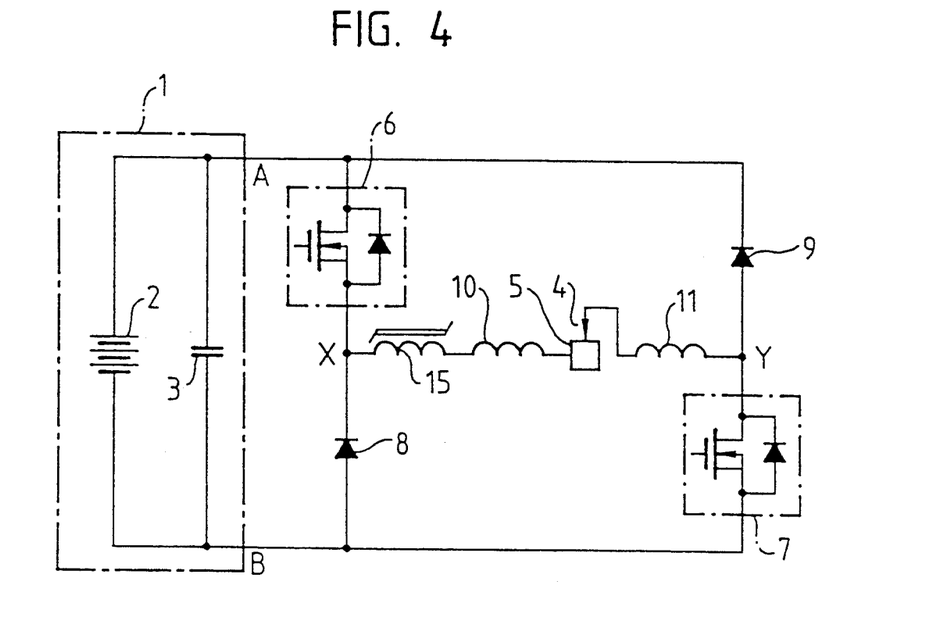
FIG. 4 is a circuit diagram illustrating a third preferred embodiment of the invention.

FIG. 4 is a circuit diagram illustrating a third embodiment of the invention. As shown in FIG. 4, a saturable reactor is provided in series with the workpiece 5 and the electrical discharge machining electrode 4.

Figure 5:
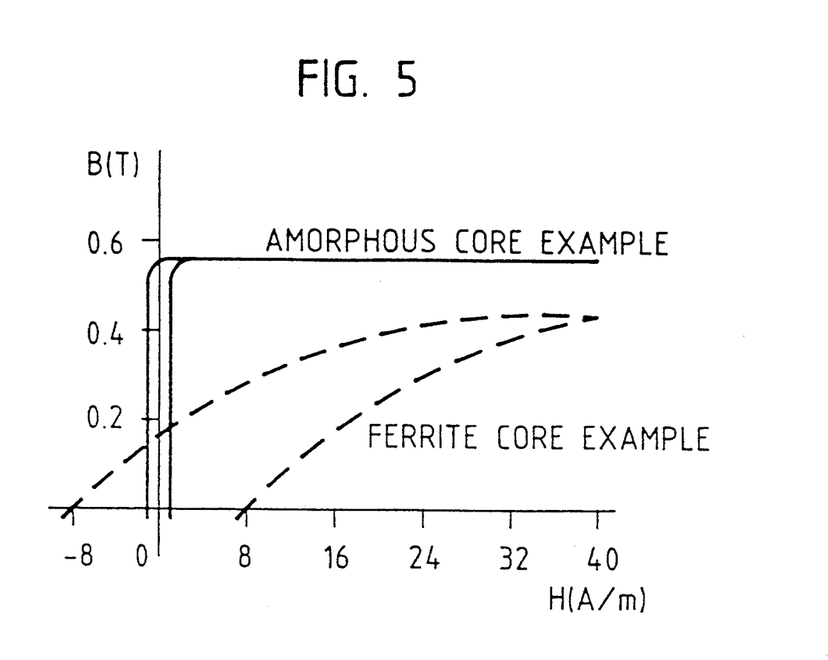
FIG. 5 illustrates direct-current magnetic characteristic examples of the amorphous core and ferrite core of saturable reactors.

The saturable reactor 15 employed in FIG. 4 begins to operate immediately after the current reduces and is reversed in flow direction. The saturable reactor 15 acts as a large inductance only when the current is still small, and is flux-saturated and acts as an extremely small inductance when the current increases. In addition, the saturable reactor 15 is nearly 100% in square ratio, exhibits the necessary saturation flux density, and provides a small coercive force. An example of a saturable reactor having such characteristics is an amorphous core-type reactor; a characteristic example is shown in the graph of FIG. 5 which represents a direct-current magnetic characteristic. As shown, the amorphous core has a more desirable characteristic than the ferrite core. The above characteristic causes the current flowing in the feedback circuit to be small and the inductance to be large during the reverse recovery time of the rectifying devices 8, 9 in which damage may occur to the MOSFETs 6, 7. Accordingly, the excessive voltage generated in the wiring inductances 10, 11 is applied across the saturable reactor 15. Thus, the excessive reverse voltage is not applied to the MOSFET 7, and therefore the MOSFET 7 is not damaged.

Figure 6:
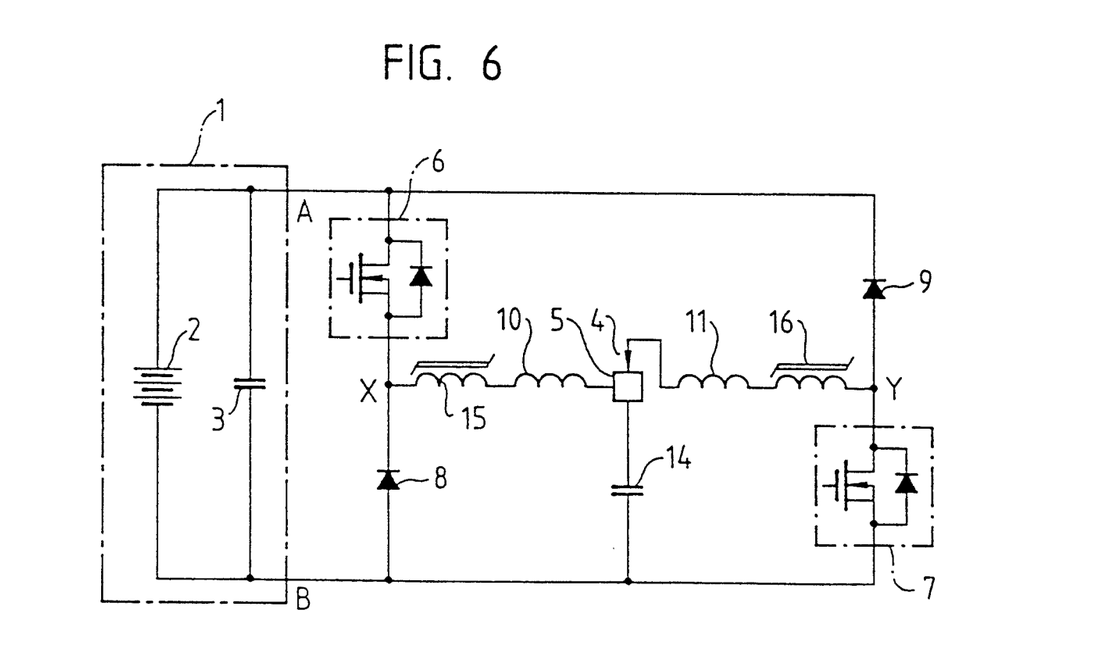
FIG. 6 is a circuit diagram illustrating a fourth preferred embodiment of the invention.

FIG. 6 is a circuit diagram illustrating a fourth embodiment of the invention. The embodiment of FIG. 6 is a modification of the third embodiment of FIG. 4. Specifically, while in the embodiment of FIG. 4 one saturable reactor 15 is disposed in series with the workpiece 5 and the electrical discharge machining electrode 4, two saturable reactors 15, 16 are provided as shown in FIG. 6. The arrangement of FIG. 6 prevents the excessive reverse voltage from being applied to the MOSFETs 6, 7 if a stray capacitance 14 exists between the workpiece 5 and the terminal B of the power supply circuit 1 as in the embodiment of FIG. 3. Accordingly, the embodiment of FIG. 6 is similar to the embodiment of FIG. 3 except that saturable reactors 15, 16 are employed instead of rectifying devices 12, 13.

Figure 7:
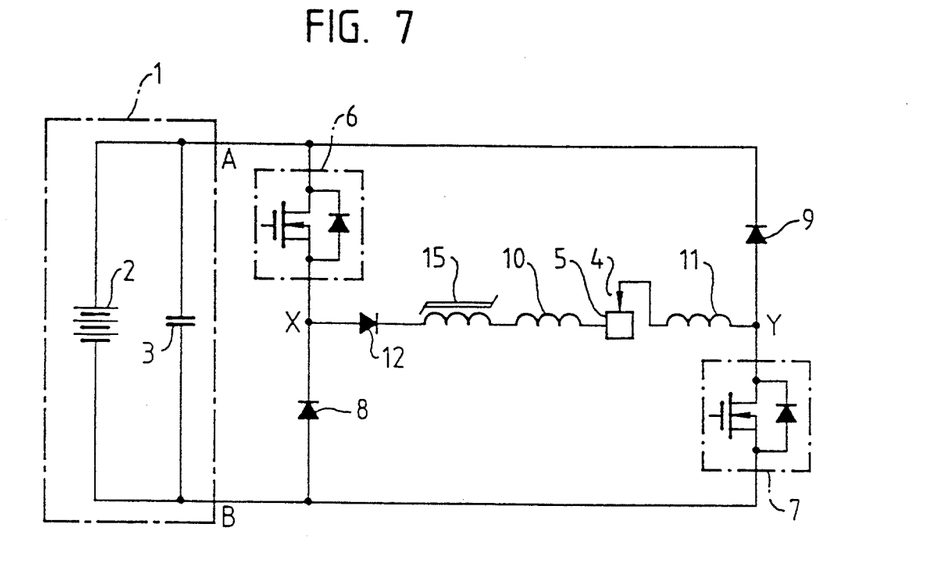
FIG. 7 is a circuit diagram illustrating a fifth preferred embodiment of the invention.

FIG. 7 is a circuit diagram illustrating a fifth embodiment of the invention. In FIG. 7 saturable reactor 15 is provided in series with the workpiece 5, the electrical discharge machining electrode 4 and the rectifying device 12 between connection points X and Y. This arrangement allows the excessive voltage produced in the wiring inductances 10, 11 to be reliably blocked by the rectifying device 12 as described in connection with the embodiment of FIG. 1. However, whereas in the embodiment of FIG. 1 the excessive voltage is applied to the rectifying device 12, in the embodiment of FIG. 7, the excessive voltage is applied to the saturable reactor 15, thereby preventing not only the MOSFETs 6, 7 from being damaged, but also the rectifying device 12.

Figure 8:
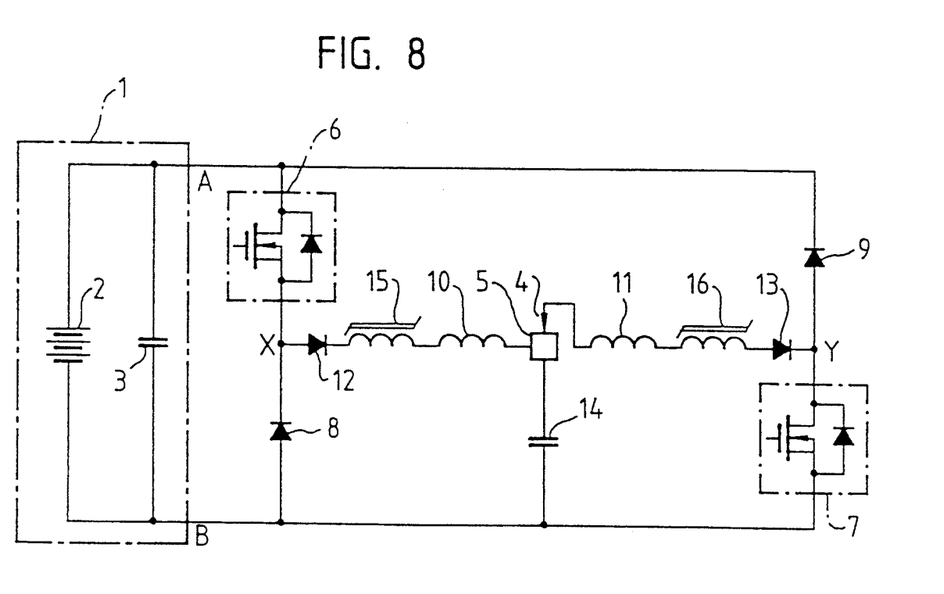
FIG. 8 is a circuit diagram illustrating a sixth preferred embodiment of the invention.

FIG. 8 is a circuit diagram illustrating a sixth embodiment of the invention which is a modification to the embodiment of FIG. 7. Specifically, while one rectifying device 12 and one saturable reactor 15 are disposed in series with the workpiece 5 and the electrical discharge machining electrode 4 in the FIG. 7 embodiment, as shown in FIG. 8, two rectifying devices 12, 13 and two saturable reactors 15, 16 are provided. The arrangement of FIG. 8 allows the excessive voltage developed in the wiring inductance 11 to be reliably blocked by the rectifying device 13 if a stray capacitance 14 exists between the workpiece 5 and the terminal B of the direct-current power supply circuit 1 as described in connection with the FIG. 3. However, whereas the excessive voltage is applied to the rectifying device 13 in FIG. 3 embodiment, in the embodiment of FIG. 8 the excessive voltage is applied to the saturable reactor 16, thereby preventing damage to not only the MOSFET 7, but also the rectifying device 13.

Figure 9:
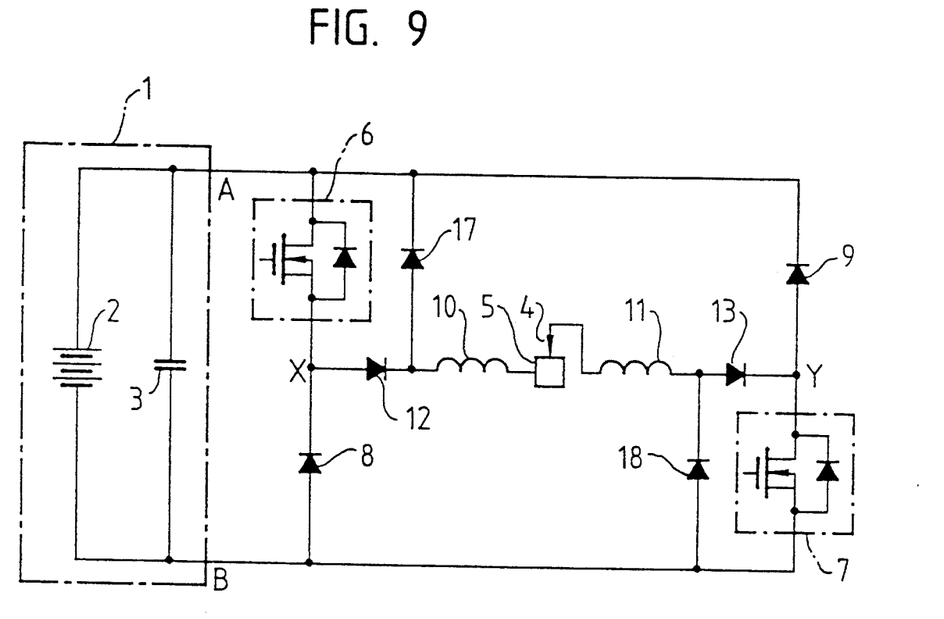
FIG. 9 is a circuit diagram illustrating a seventh preferred embodiment of the invention.

FIG. 9 is a circuit diagram illustrating a seventh embodiment of the present invention. In FIG. 9, a rectifying device 17 is provided for limiting the voltage applied to the rectifying device 12, and a rectifying device 18 is provided for limiting the voltage applied to the rectifying device 13.

Figure 10A:
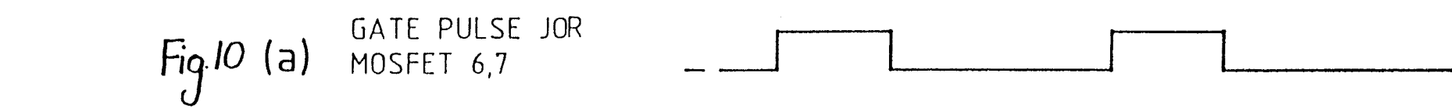
FIGS. 10(a)-10(h) are timing charts illustrating the operation of the seventh preferred embodiment of the invention.
Figure 10B:
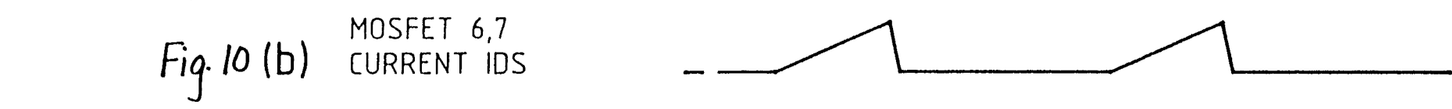
Figure 10C:
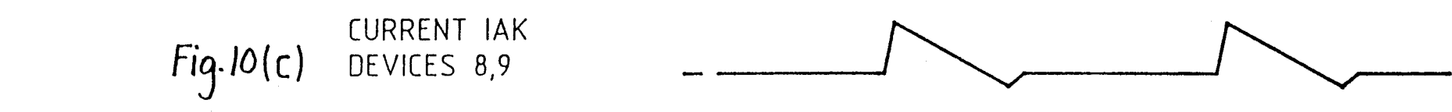
Figure 10D:
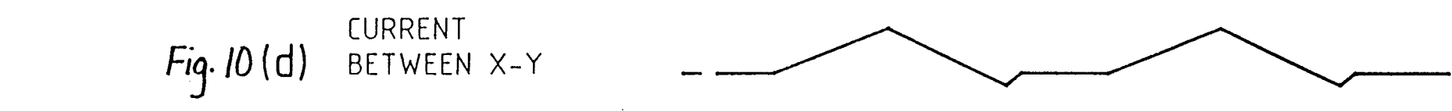
Figure 10E:
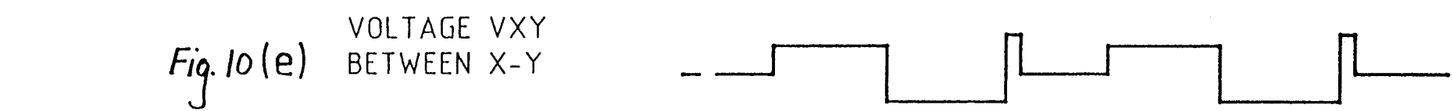
Figure 10F:
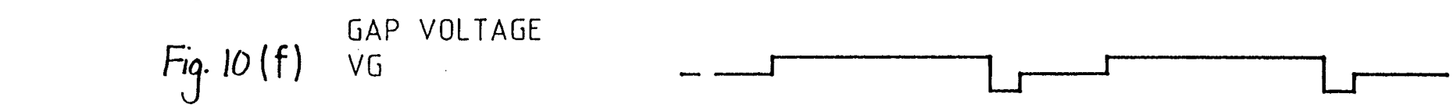
Figure 10G:
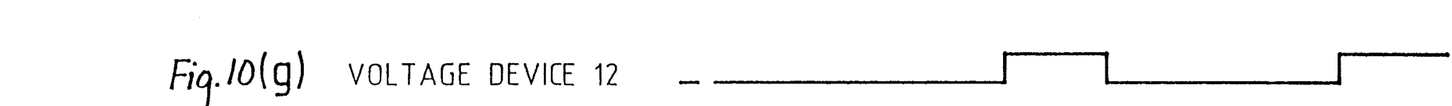
Figure 10H:
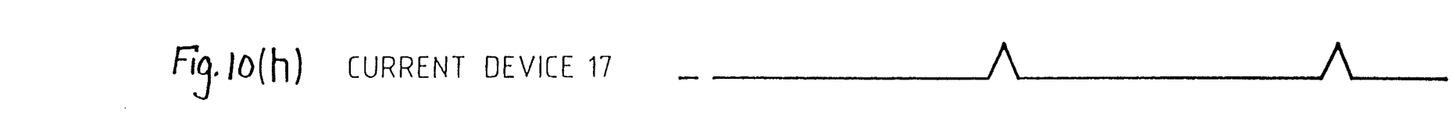

The operation of the electrical discharge machining power supply shown in FIG. 9 will now be described with reference to the timing chart in FIG. 10. As described above, the rectifying devices 12, 13 have shorter reverse recovery times than the rectifying devices 8, 9, respectively. Also, in view of inherent variations among rectifying devices, the timing chart of FIG. 10 is plotted assuming that the rectifying device 12 turns off the fastest. FIG. 10(a) shows a repeated pulse applied to the gates of the MOSFETs 6, 7 to cause the MOSFETs 6, 7 to alternately turn on and off in synchronization with each other. FIG. 10(b) shows a current Ids flowing in the MOSFETs 6, 7. FIG. 10(c) shows a current Iak flowing in the rectifying devices 8, 9. FIG. 10(d) shows a current flowing from connection point X to connection point Y in FIG. 9, i.e., a current IG flowing in the gap between the electrical discharge machining electrode 4 and the workpiece 5. FIG. 10(e) shows a voltage Vxy across the connection points X and Y in FIG. 9. FIG. 10(f) shows a voltage VG across the gap. FIG. 10(g) shows a voltage imposed across the rectifying device 12, and FIG. 10(h) shows a current through the rectifying device 17.

As shown in the timing chart of FIG. 10, when the rectifying devices 8, 9 are in the reverse recovery state, the rectifying device 12 (which is shorter in reverse recovery time than the rectifying devices 8, 9 and 13) is the first to turn off when the current accumulated in the wiring inductances 10, 11 is fed back. At this point, i.e., when the rectifying devices 8, 9, 13 are on and the rectifying device 12 is off, the potential at the connection point X in FIG. 9 is equal to that at the power supply terminal B, and the potential at the point Y is equal to that at the power supply terminal A. If V0 is the voltage between the terminals A and B of the direct-current power supply circuit 1, then the voltage Vxy between the connection points X and Y in FIG. 9 is equal to V0. Consequently, the excessive current produced in the wiring inductances 10, 11 is imposed across the rectifying device 17. If the voltage applied to the rectifying device 17 becomes greater than the output voltage V0 of the direct-current power supply circuit 1, then the rectifying device 17 is forward-biased and returns the energy accumulated in the wiring inductances to the direct-current power supply circuit 1. Hence, the voltage applied to the rectifying device 12 does not rise above the output voltage V0 of the direct-current power supply circuit 1, and therefore the rectifying device 12 is not damaged.

If, for example, the output voltage V0 of the direct-current power supply circuit 1 is 220V, the gap voltage VG is 20V, the wiring inductance is 3$\mu$H, each of the MOSFETs 6, 7 ON time is 1.5$\mu$s, the reverse recovery time of the rectifying device 12 is 45ns, and the current continues to be reduced for the first 30ns according to a slope determined by the wiring inductances and returns to zero amperes in the remaining 15ns, then the reverse recovery current Irp (the maximum instantaneous value of the reverse current) is:

$$Irp = [(220V - 20V)/3\mu H]\ 30ns = 2A;$$

and the voltage VLP generated in the wiring inductances 10, 11 at a time when the reverse recovery current Irp returns to zero amperes in the remaining 15ns is:

$$VLP = 3\mu H \times 2A/15ns = 400V.$$

Since the rectifying devices 8, 9 and 13 are still on, the potential at the connection point X in FIG. 9 is zero volts and the voltage at the connection point Y is 220 volts. Thus, a difference of 380 volts (i.e., the voltage difference between the voltage VLP generated in the wiring inductances 10, 11 and the gap voltage VG) is applied to the rectifying device 12. However, if the cathode-side potential of the rectifying device 12 exceeds the 220-volt output voltage of the direct-current power supply circuit 1, then the rectifying device 17 is forward-biased, thereby returning the energy accumulated in the wiring inductances to the direct-current power supply circuit 1 from the rectifying device 18 via the wiring inductance 11, the electrical discharge machining electrode 4, the workpiece 5 and the rectifying device 17. Consequently, the voltage in excess of the 220-volt output voltage of the direct-current power supply circuit 1 is not applied across the rectifying device 12, and therefore the rectifying device 12 will not be damaged.

The energy of the wiring inductances, which as described above is the cause of the excessive voltage, is ordinarily returned to the direct-current power supply circuit 1 as described in connection with FIG. 9. However, if the impedance of the parasitic diode of the MOSFET 7 is smaller than that of the rectifying device 18, then the rectifying device 13 is still on and the energy of the wiring inductances 10, 11 is therefore returned to the direct-current power supply circuit 1 via the parasitic diode of the MOSFET 7, the rectifying device 13, the wiring inductance 11, the electrical discharge machining electrode 4, the workpiece 5, the wiring inductance 10, and the rectifying device 17. In this case, since the current capacity of the parasitic diode is generally small, the parasitic diode (i.e., the MOSFET 7) may be damaged if the returned current caused by the energy of the wiring inductance 10, 11 is large.

Figure 11:
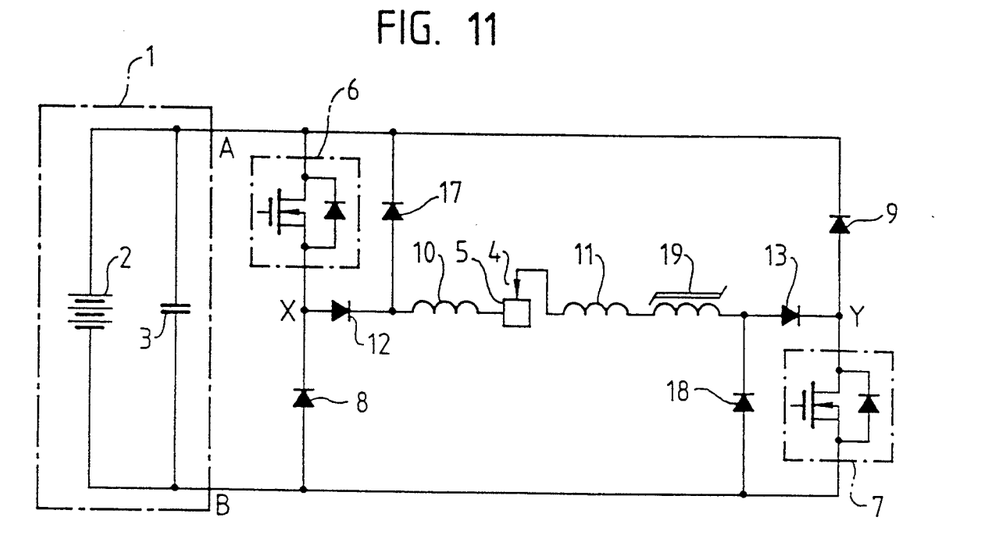
FIG. 11 is a circuit diagram illustrating an eighth preferred embodiment of the invention.

FIG. 11 shows an embodiment for resolving this problem, wherein a saturable reactor 19 is provided in series with the workpiece 5 and the electrical discharge machining electrode 4. The arrangement of FIG. 11, i.e., the inclusion of saturable reactor 19, allows the energy of the wiring inductances 10, 11 returned as the current to the direct-current power supply circuit 1 through the parasitic diode of the MOSFET 7 to be suppressed, thereby preventing the MOSFET 7 from being damaged.

Figure 12:
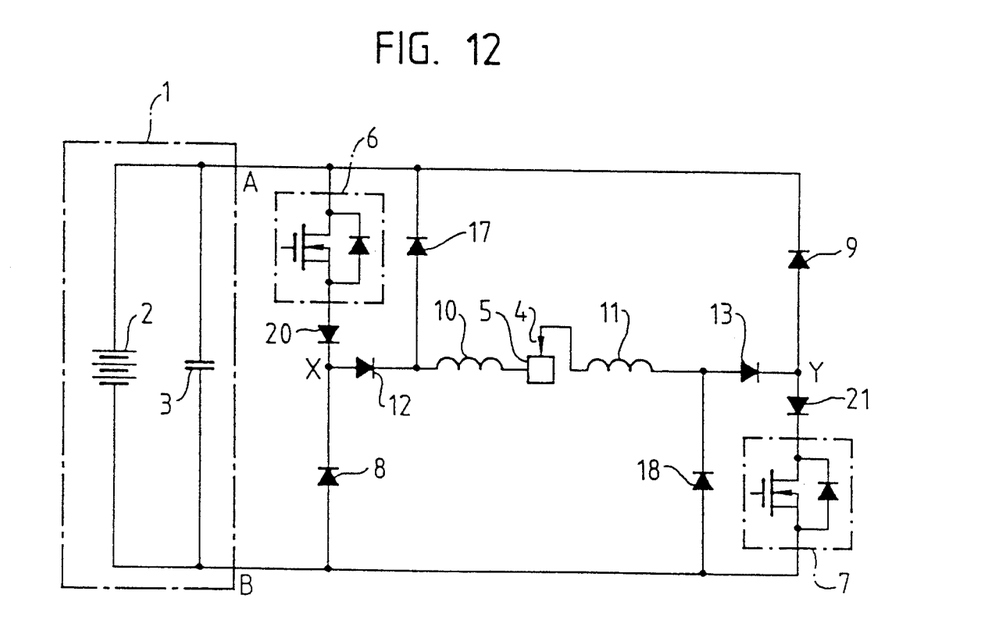
FIG. 12 is a circuit diagram illustrating a ninth preferred embodiment of the invention.

FIG. 12 shows another embodiment of the invention, wherein rectifying devices 20 and 21 are disposed in series with the switching devices 6 and 7, respectively. If the impedance of the parasitic diode in the MOSFET 7 is smaller than that of the rectifying device 18, then the arrangement of FIG. 12 allows the energy of the wiring inductances 10, 11 to be returned to the direct-current power supply circuit 1 from the rectifying device 18 via the wiring inductance 11, the electrical discharge machining electrode 4, the workpiece 5, the wiring inductance 10 and the rectifying device 17, without the current flowing in the parasitic diode of the MOSFET 7. Accordingly, there is no damage to the MOSFET 7.

Figure 13:
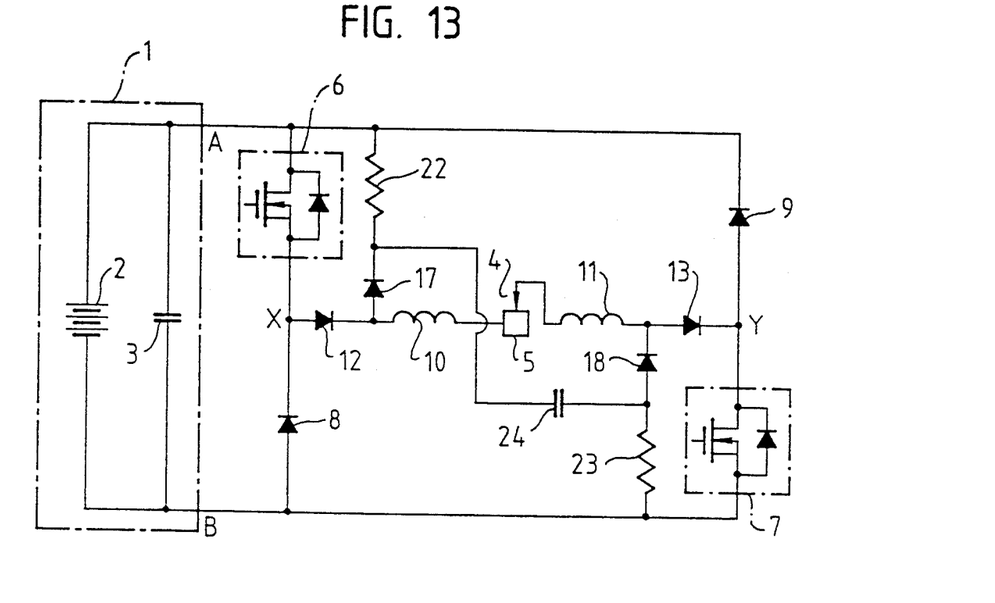
FIG. 13 is a circuit diagram illustrating a tenth preferred embodiment of the invention.

FIG. 13 shows another embodiment of the invention, wherein resistors 22 and 23 are disposed in series with the rectifying devices 17 and 18, respectively, and a capacitor 24 is provided between the cathode of the rectifying device 17 and the anode of the rectifying device 18. In the arrangement of FIG. 13, when the rectifying device 12 is shorter in reverse recovery time than the rectifying devices 8, 9 and 13, then the capacitor 24 is connected to the outputs of the direct-current power supply circuit 1 via the resistors 22, 23 even at the reverse recovery time of the rectifying device 12, and the voltage across the capacitor 24 is generally the output voltage of the direct-current power supply circuit 1. Hence, no voltage above the output voltage of the direct-current power supply circuit 1 is applied to the rectifying device 12, thereby preventing the rectifying device from being damaged. Also, if the impedance of the parasitic diode in the MOSFET 7 is smaller than that of the rectifying device 18, the arrangement of FIG. 13 maintains the impedances of the resistors 22, 23 to be almost equal to or larger than those of the rectifying devices 17, 18. Accordingly, the energy of the wiring inductances is accumulated in the capacitor 24 at the time of the reverse recovery (i.e., the current from the wiring inductance 11 flows to the rectifying device 18 via the electrical discharge machining electrode 4, the workpiece 5, the wiring inductance 10, the rectifying device 17 and the capacitor 24), and the MOSFET 7 will therefore not be damaged. Specifically, the increase in the value of the resistor 23 makes it difficult for the current to flow from the wiring inductance 11 through the electrical discharge machining electrode 4, the workpiece 5, the wiring inductance 10, the rectifying device 17, the capacitor 24, the resistor 23, and the parasitic diode of the MOSFET 7 to the rectifying device 13. Accordingly, the current will tend to flow from the wiring inductance 11 to the rectifying device 18 via electrode 4, workpiece 5, wiring inductance 10, rectifying device 17 and capacitor as discussed above, thereby preventing an excessive reverse current from flowing in the parasitic diode of the MOSFET 7.

Figure 14A:
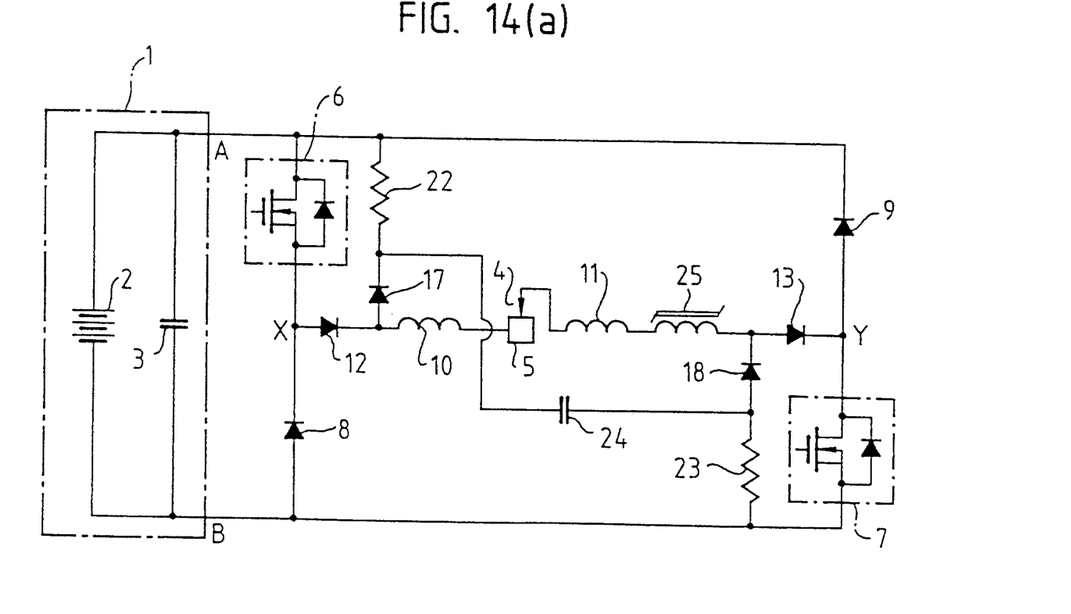
FIGS. 14(a)-14(b) are circuit diagrams illustrating an eleventh preferred embodiment of the invention.

FIG. 14(a) shows another embodiment of the invention, wherein a saturable reactor 25 is provided in series with the workpiece 5 and the electrical discharge machining electrode 4. When the energy of the wiring inductances is accumulated in the capacitor 24 as described in connection with FIG. 13, the arrangement of FIG. 14(a) suppresses the excessive current, lightens the capacitor 24 of its load, and further suppresses a high-frequency current caused by the resonance of the capacitor 24 and the wiring inductances 10, 11.

Figure 14B:
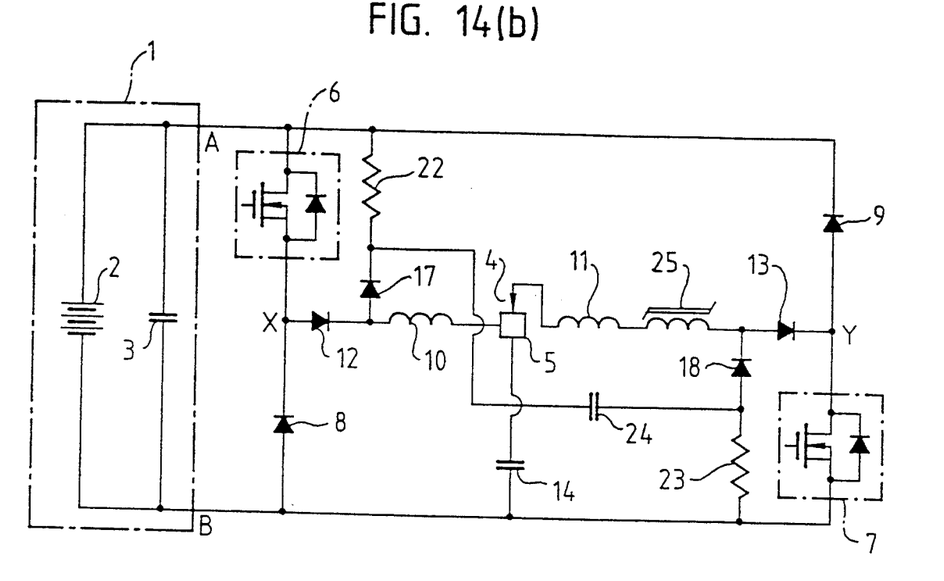

As shown in FIG. 14(b), the same effect can be obtained by the circuitry of FIG. 14(a) having stray capacitance. Capacitor 14 of FIG. 14(b) represents such stray capacitance.

It will be appreciated that switching devices smaller in reverse current immunity, other than the MOSFETs, e.g., transistor modules having circulation rectifying devices small in current capacity, may also be utilized as switching devices instead of the MOSFETs shown in FIGS. 1-4.

It will be apparent that the invention, as described above, provides an electrical discharge machining power supply which includes at least one rectifying device having a reverse recovery time which is shorter than the rectifying device(s) constituting a feedback circuit connected in series with an electrical discharge machining power supply and a workpiece, whereby an excessive voltage generated in wiring inductances of the circuit when the switching devices are off is applied to the at least one rectifying device having the shorter reverse recovery time (i.e., the at least one rectifying device which turns off faster than the rectifying devices constituting the feedback circuit), and the excessive voltage is not applied to the switching devices, thereby preventing the switching devices from being damaged.

It will also be apparent that the invention provides an electrical discharge machining power supply circuit which includes at least one saturable reactor connected in series with the electrical discharging electrode and the workpiece, whereby the excessive voltage generated in the wiring inductances when the switching devices are off is applied to the at least one saturable reactor (which has a large inductance when a current is small), and the excessive voltage is not applied to the switching devices, thereby preventing the switching devices from being damaged.

It will also be apparent that the invention provides an electrical discharge machining power supply circuit which includes at least one rectifying device (having a reverse recovery time which is shorter than the rectifying devices constituting the feedback circuit) connected in series with the electrical discharge machining power supply and the workpiece, and also includes at least one saturable reactor connected in series with the at least one rectifying device having the shorter reverse recovery time, whereby the excessive voltage generated in the wiring inductances when the switching devices are off is blocked by the at least one rectifying device (which turns off faster than the rectifying devices constituting the feedback circuit), and the excessive voltage is applied to the at least one saturable reactor so as to prevent not only the switching devices, but also the at least one rectifying device with the shorter reverse recovery time from being damaged.

It will also be apparent that the invention provides an electrical discharge machining power supply circuit which does not require that a device protecting surge absorber circuit be provided for the switching devices and rectifying devices constituting the feedback circuit, thereby simplifying the circuit arrangement.

It will also be apparent that the invention provides an electrical discharge machining power supply circuit which includes rectifying devices for limiting the amount of voltage applied to the rectifying devices having the shorter reverse recovery time, thereby preventing these rectifying devices from being damaged.

It will also be apparent that the invention provides an electrical machining power supply circuit which includes first rectifying devices for limiting the amount of voltage applied to the rectifying devices having the shorter reverse recovery time and also includes second rectifying devices connected in series with the switching devices, whereby if the impedance of the switching devices is smaller than that of the second rectifying devices, no reverse current flows in the switching devices, thereby protecting the switching devices from damage.

It will also be apparent that the invention provides an electrical discharge machining power supply circuit which includes rectifying devices and a capacitor for suppressing the amount of voltage applied to the rectifying devices having a shorter reverse recovery time and also includes respective impedances connected in series with the rectifying devices, whereby both the rectifying devices having the shorter reverse recovery time and the switching devices are protected from damage.

It will be apparent that the invention provides an electrical discharge machining power supply circuit which includes rectifying devices for suppressing the amount of voltage applied to the rectifying devices having a shorter reverse recovery time and also includes a saturable reactor connected in series with the workpiece and the electrical discharge machining electrode, or includes rectifying devices and a capacitor for limiting the amount of voltage applied to the rectifying devices having the shorter reverse recovery time and also includes respective impedances connected in series with the rectifying devices and further includes a saturable reactor connected in series with the workpiece and the electrical discharge machining electrode, whereby the rectifying devices having the shorter reverse recovery time and the switching devices are protected from damage, an excessive current to the capacitor can be suppressed, and a high-frequency current caused by the resonance of the capacitor and the wiring inductances can be prevented.

What is claimed is:

1. An electrical discharge machining power supply circuit comprising:
    a power supply circuit comprising only a single direct-current power source;
    a first circuit, connected in parallel with said power supply circuit, and comprising a first switching device and a first rectifying device connected in series with said first switching device, said first circuit having a first connection point between said first switching device and said first rectifying device;
    a second circuit, connected in parallel with said first circuit, and comprising a second switching device and a second rectifying device connected in series with said second switching device, said second circuit having a second connection point between said second switching device and said second rectifying device;
    an electrical discharge machining electrode and a workpiece which are in series between said first connection point and said second connection point, said first and second switching devices being controlled such that an electrical discharge is generated between said electrode and the workpiece; and
    first circuit means comprising a first circuit device, connected between said workpiece and said first connection point, for preventing an excessive voltage, generated in wiring inductance between said first and second connection points during switching of said first and second switching devices, from damaging at least said first switching device.

2. The machining power supply circuit as defined in claim 1, wherein said first circuit device comprises a third rectifying device connected between said first connection point and the workpiece, said third rectifying device having a reverse recovery time which is shorter than a reverse recovery time of said first rectifying device.

3. The machining power supply circuit as defined in claim 2, wherein said first circuit means also prevents the excessive voltage from damaging said second switching device when a stray capacitance exists between the workpiece and a terminal of said power supply circuit, and wherein said first circuit means further comprises a fourth rectifying device connected between said electrical discharge machining electrode and said second connection point, said fourth rectifying device having a reverse recovery time which is shorter than a reverse recovery time of said second rectifying device.

4. The machining power supply circuit as defined in claim 1, wherein said first circuit means comprises a first saturable reactor connected between said first connection point and the workpiece.

5. The machining power supply circuit as defined in claim 4, wherein said first circuit means also prevents the excessive voltage from damaging said second switching device when a stray capacitance exists between the workpiece and a terminal of said power supply circuit, and wherein said first circuit means further comprises a second saturable reactor connected between said electrical discharge machining electrode and said second connection point.

6. The machining power supply circuit as defined in claim 2, further comprising a second circuit means for preventing the excessive voltage from damaging said third rectifying device.

7. The machining power supply circuit as defined in claim 6, wherein said second circuit means comprises a first saturable reactor connected between said third rectifying device and the workpiece.

8. The machining power supply circuit as defined in claim 7, further comprising a fourth rectifying device connected between said electrical discharge machining electrode and said second connection point, said fourth rectifying device having a reverse recovery time which is shorter than the reverse recovery time of said second rectifying device so as to prevent the excessive voltage from damaging said second switching device when a stray capacitance exists between the workpiece and a terminal of said power supply circuit, wherein said second circuit means also prevents the excessive voltage from damaging said fourth rectifying device, and wherein said second circuit means further comprises a second saturable reactor connected between said electrical discharge machining electrode and said fourth rectifying device.

9. The machining power supply circuit as defined in claim 3, wherein said power supply circuit includes positive and ground terminals, and wherein the machining power supply circuit further comprises second circuit means for limiting an amount of voltage applied to said third rectifying device, and wherein said second circuit means comprises a fifth rectifying device connected between the workpiece and the positive terminal of said power supply circuit.

10. The machining power supply circuit as defined in claim 9, wherein said second circuit device also prevents the excessive voltage from damaging said fourth rectifying device, and wherein said second circuit device further comprises a sixth rectifying device connected between said electrical discharge machining electrode and the ground terminal of said power supply circuit.

11. The machining power supply circuit as defined in claim 10, further comprising a saturable reactor connected between said electrical discharge machining electrode and said fourth rectifying device.

12. The machining power supply circuit as defined in claim 10, further comprising a seventh rectifying device connected between said first switching device and said first connection point.

13. The machining power supply circuit as defined in claim 12, further comprising an eighth rectifying device connected between said second connection point and said second switching device.

14. The machining power supply circuit as defined in claim 3, further comprising a fifth rectifying device, a sixth rectifying device, a first resistive element, a second resistive element, and a capacitor, said first resistive element and said fifth rectifying device being connected in series between said third rectifying device and a positive terminal of said power supply circuit, said sixth rectifying device being connected in series with said second resistive element between said fourth rectifying device and a negative terminal of said power supply circuit, said capacitor being connected between a third connection point and a fourth connection point, the third connection point being between said first resistive element and said fifth rectifying device, and the fourth connection point being between said second resistive element and said sixth rectifying device.

15. The machining power supply circuit as defined in claim 14, further comprising a saturable reactor connected between said fourth rectifying device and said electrical discharge machining electrode.

16. The machining power supply circuit as defined in claim 15, wherein said first and second switching devices turn on and off in synchronization with each other.

17. The machining power supply circuit as defined in claim 15, wherein each said first and second switching circuits includes a MOSFET.

18. The machining power supply circuit as defined in claim 15, wherein each of said first, second, third, fourth, fifth and sixth rectifying devices is a diode.

19. The machining power supply circuit as defined in claim 1, further comprising a capacitor connected in parallel with said single direct-current power source.

* * * * *